Patented Jan. 29, 1935

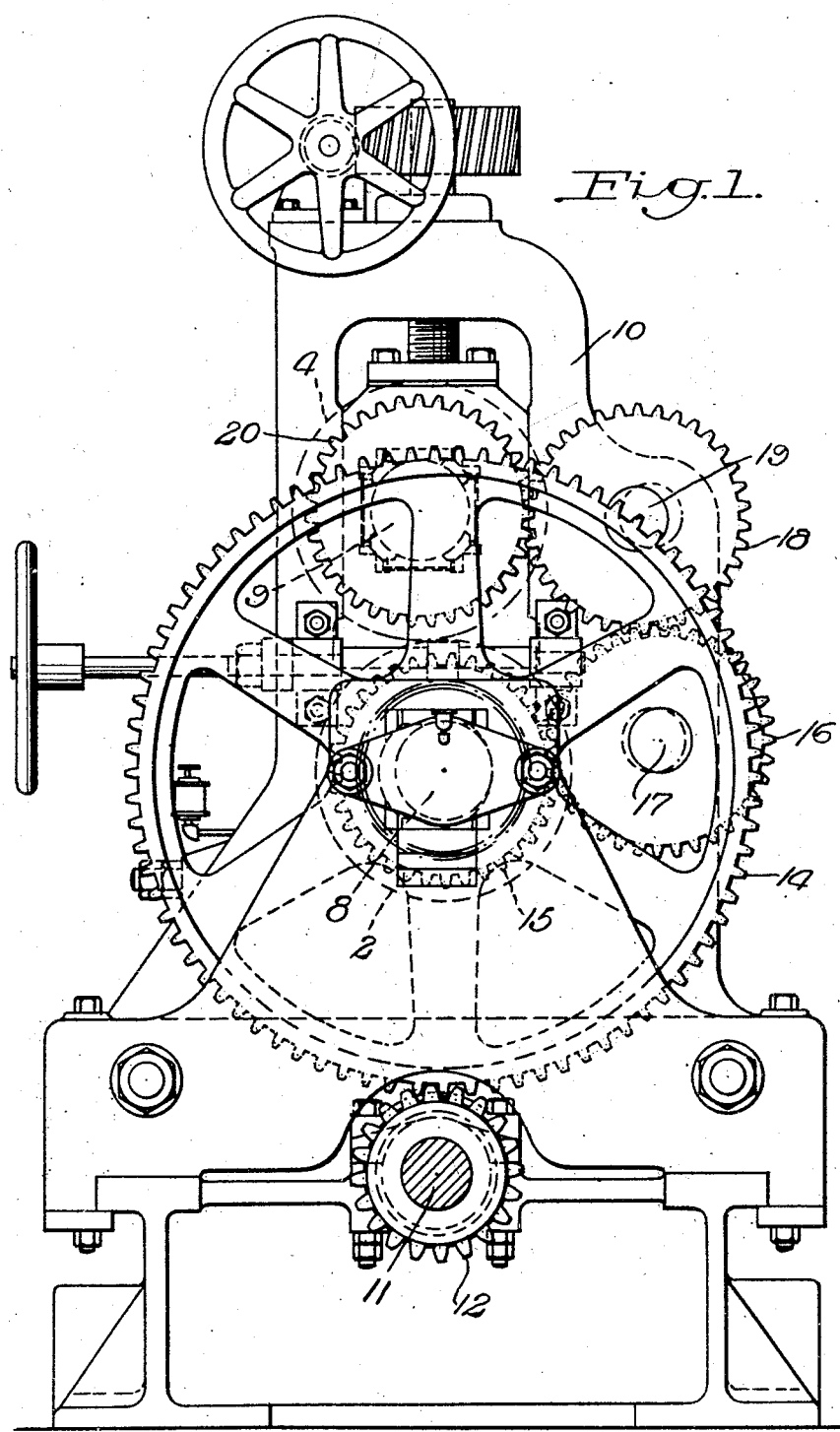

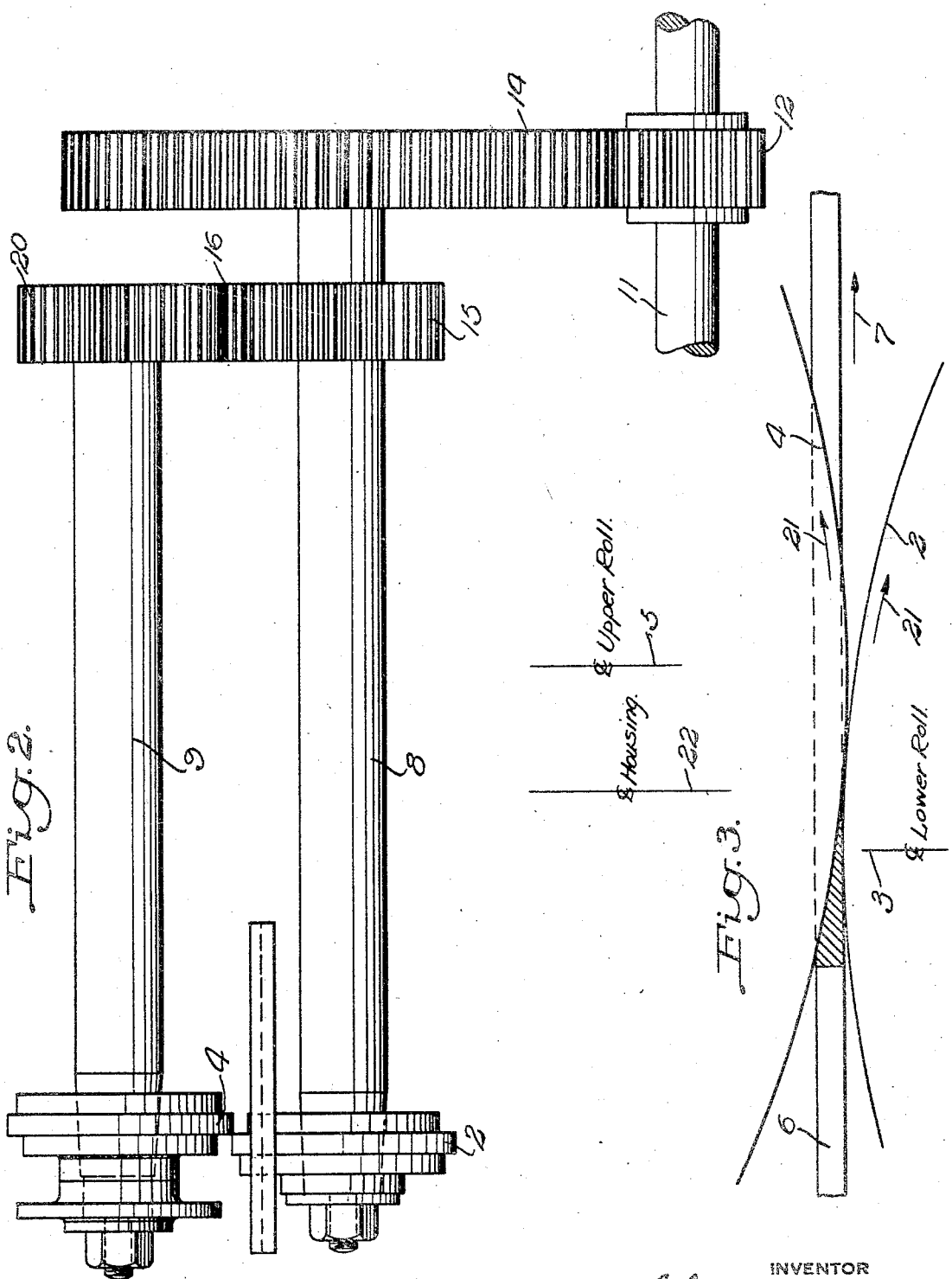

1,989,136

UNITED STATES PATENT OFFICE 1,989,136

METAL SHEARING APPARATUS

John Geggus, Youngstown, Ohio, assignor to The Youngstown Sheet & Tube Company, Youngstown, Ohio, a corporation of Ohio Application March 5, 1931, Serial No. 520,248

6 Claims. (Cl. 164—60)

The present invention relates broadly to the art of shearing metal and more particularly to shearing by means of rotary shears.

It is customary in the art to which the invention relates in making rotary shears of the so-called disk type utilized for splitting or trimming, to mount the disk cutters on arbors or shafts having their axes directly superimposed. By reason of this arrangement, if a piece of material is fed between the disks in a substantially horizontal direction, the material is engaged by the upper disk and depressed in a plane in which there is no opposing support. In other words, the upper disk engages the material in advance of the theoretical shearing point and depresses it before such shearing point is actually reached. By reason of this action, the material is only partly sheared, the majority of the action being a cracking or breaking action. This results in an uneven edge.

In an effort to obviate this difficulty and more effectively support the material as it is being sheared, it has been proposed to utilize a lower disk of materially greater diameter than the upper disk. By reason of this construction, the larger lower disk serves to more effectively support the material in advance of the theoretical cutting point and minimizes the breaking or cracking off tendency before referred to. The construction is, however, open to the objection that the different sized shear knives require different jigs and machines for maintaining the same properly sharpened. This in turn runs into a large plant installation cost for maintaining the shears in proper working condition.

It is one of the objects of the present invention to provide an improved shear whereby the upper and lower disks may be maintained of the desired uniform diameter, and the required supporting of the material obtained in such manner as to preclude breaking or cracking off thereof. The advantages in this respect are obtained by offsetting the axes of the shears in such manner that the material being sheared passes the axis of the lower shear before it reaches the plane of the axis of the upper shear.

In the accompanying drawings I have shown more or less diagrammatically, for purposes of illustration only, a preferred embodiment of the present invention. In the drawings:

Figure 1 is an end elevational view of one form of shear constructed in accordance with the present invention;

Figure 2 is a detail elevational view, showing the shears and shear arbors; and

Fig. 3 is a diagrammatic view illustrating the relationship of the shears themselves.

Referring more particularly to Figure 3 of the drawings, there is illustrated a lower shear 2 rotatable about an axis lying in the center line 3, and an upper shear 4 rotatable about an axis lying in the center line 5. From this figure it will be noted that the axes of the respective shears lie in planes which are offset in the direction of travel of the material being sheared, it being understood that the material 6 being sheared is adapted to travel in the direction indicated by the arrow 7.

The lower shear 2 is carried by an arbor 8 while the upper shear 4 is carried by a similar arbor 9, which arbors are suitably journaled in a housing 10 by means of bearing chucks slidable in the housing windows, having removable bearing blocks therein. Also journaled in the housing is a drive shaft 11, adapted to receive power from any desired source, not shown, and carrying a drive pinion 12 meshing with a driving gear 14 on the arbor 8. Secured to the arbor 8 is a gear 15 meshing with a similar gear 16 on an eccentric shaft 17. The gear 16 meshes with a second gear 18 on an eccentric shaft 19, which second gear is in turn effective for driving a gear 20 on the arbor 9. If the gears 15, 16, 18 and 20 are of the same diameter, it will be apparent that the arbors 8 and 9, and therefore the shears 2 and 4 are caused to rotate in synchronism. In many cases such a synchronous rotation of the shears is desired, although it will be apparent that any other gear ratio may be substituted at the will of the designer.

The eccentric shafts 17 and 19 are suitably journaled in the housing 10, and permit the necessary adjustment to be imparted to the gears 16 and 18 for maintaining them in mesh one with the other and in mesh also with the respective gears 15 and 20, irrespective of the amount of offsetting of the center lines 3 and 5. The details of the housing, and the manner of driving the shears constitute no limitation as to the present invention, the present embodiment being shown for purposes of completely illustrating one manner of operating the shears.

The shaft 11 being driven in the proper direction, the shears are rotated in the direction indicated by the arrows 21, thus preparing them for the reception of the material 6. The material being fed forwardly in the direction indicated by the arrow 7, it is caused to ride upon the lower shear 2 which thus affords a supporting surface acting in opposition to the downward pressure of the upper shear 4. The material being actually supported by the lower shear, any breaking or tearing as distinguished from a true cutting is precluded, the shearing progressing as the material approaches the center line 22 representing the center line of the housing and the point of theoretical completion of the shearing operation. It is on this line that the shears most closely approach one to the other or have their maximum overlap.

From the foregoing description, it will be apparent that by the mere expedient of advancing the lower shear into the line of feed of the material, there is afforded by the shear itself a supporting surface effective for resisting the downward pressure of the upper shear. This makes it possible to utilize upper and lower shears of the same diameter, and at the same time obtain true shearing of the material and thus a truer edge condition.

The advantages of the invention arise primarily from the offsetting of the axes of the shears or disks as well as from the positioning of the shears in such manner as to afford a support concomitantly with the use of disks of the same diameter.

While I have herein illustrated and described more or less diagrammatically, one preferred embodiment of the present invention, it will be understood that changes in the construction and arrangement of the parts herein illustrated and referred to may be made without departing either from the spirit of the present invention or the scope of my broader claims.

I claim:

1. A shear, comprising a housing, shear arbors in said housing having their axes offset horizontally and vertically of said housing, means for adjusting said arbors relative to one another, means for driving said arbors including driving gears and shafts therefor disposed substantially parallel to said arbors, and eccentric means to shift said shafts to permit proper driving relation of said gears to the arbors upon adjustment of the arbors.

2. A shear comprising a housing, shear arbors mounted in said housing with their axes offset horizontally and vertically of said housing, means for adjusting the arbors relative to one another, disk shears of substantially the same diameter on said arbors, and means for driving said arbors including driving gears and shafts therefor mounted in said housing, and eccentric means to shift said shafts to permit proper driving relation of the gears and arbors on adjustment of the arbors.

3. A shear comprising a housing, a bearing housing with windows therein, bearing chucks slidable in said windows, arbors journaled in said chucks, disk shears carried on said arbors and having substantially the same diameter, said arbors being journaled in said chucks with their axes offset horizontally, drive shafts and gears for said arbors and eccentric means to shift the shafts to maintain proper driving relation of the gears to the arbors on adjustment of said chucks.

4. In a shear, a housing windows in said housing, bearing chucks slidable therein with their center lines offset horizontally, arbors journaled in said chucks, disk shears mounted on said arbors, means for adjusting said chucks in said housing, drive shafts and gears for said arbors and eccentric means to shift the shafts to maintain proper driving relation of the gears to the arbors on adjustment of said chucks.

5. In a rotary shear for progressively cutting moving metal sheets or plates, a pair of rotary shearing members of substantially the same diameter, means supporting said members for rotation about axes on opposite sides, respectively, of a plane through the theoretical line representing the point of completion of the shearing, and normal to the plane of the sheet or plate.

6. The apparatus defined by claim 5 characterized by a common drive for said members including adjustable gears interconnecting said members.

JOHN GEGGUS.